United States Patent [19]
Asay et al.

[11] Patent Number: 5,240,607
[45] Date of Patent: Aug. 31, 1993

[54] FILTER ELEMENT ADAPTER ASSEMBLY

[75] Inventors: Roger H. Asay, Santa Clara; Gordon T. Galbraith, San Ramon, both of Calif.

[73] Assignee: Radiological & Chemical Technology, Inc., Santa Clara, Calif.

[21] Appl. No.: 992,152

[22] Filed: Dec. 17, 1992

[51] Int. Cl.⁵ .............................................. B01D 35/00
[52] U.S. Cl. .................. 210/232; 210/323.2; 210/450; 210/452; 210/541
[58] Field of Search .............. 210/282, 232, 541, 542, 210/473, 474, 475, 289, 291, 288, 441, 323.2, 450, 452, 346, 193

[56] References Cited

U.S. PATENT DOCUMENTS

| | | | |
|---|---|---|---|
| 3,498,460 | 3/1970 | Lane | 210/232 |
| 3,615,016 | 10/1971 | Soriente et al. | 210/232 |
| 4,052,317 | 10/1977 | Palnik | 210/450 |
| 4,248,713 | 2/1981 | Meier | 210/232 |
| 4,319,997 | 3/1982 | Pett | 210/450 |
| 4,488,965 | 12/1984 | Müller et al. | 210/232 |
| 4,725,323 | 2/1988 | Ostreicher et al. | 210/450 |
| 4,806,240 | 2/1989 | Giordano et al. | 210/232 |
| 4,818,396 | 4/1989 | Wolf | 210/232 |
| 4,836,925 | 6/1989 | Wolf | 210/450 |
| 4,929,352 | 5/1990 | Wolf | 210/232 |
| 4,946,588 | 8/1990 | Wise | 210/232 |
| 5,028,327 | 7/1991 | Ostreicher et al. | 210/232 |
| 5,167,814 | 12/1992 | Pulek | 210/232 |

*Primary Examiner*—Stanley S. Silverman
*Assistant Examiner*—Cynthia L. Nessler
*Attorney, Agent, or Firm*—Fliesler, Dubb, Meyer & Lovejoy

[57] ABSTRACT

A filter element adapter assembly is set forth for attaching a linearly extending filter element having a wall structure formed of a filtering material and having first and second end closures, the second end closure having a passageway therethrough and defining a filter element fitting to an attachment structure. The assembly comprises first and second tubular adapters and an insert seal formulated of a material which is softer than the adapters. Large screw threads are provided on the seal and on the portions of the adapters which screw onto the seal. The adapters abut a flange on the seal to provide a leak free arrangement.

39 Claims, 2 Drawing Sheets

FILTER ELEMENT ADAPTER ASSEMBLY

TECHNICAL FIELD

The present invention is directed to a retrofitable positive sealing filter element adapter assembly. The assembly is used to enhance the ability to change tubular filter elements utilized in water treatment, for example, in boiler feed water treatment.

BACKGROUND OF INVENTION

Filtration is often employed in water treatment as well as other chemical processes as a means for separation of phases, specifically solids from liquids or gases. A common filtration process is that of surface filtration which, because of pressure drop considerations, usually requires a large filtration surface area. To effect a large filtration surface area in a vessel many filter elements or filter septa can be used which are attached to a tube sheet.

Further application of the surface filtration process has been extended to ion exchange and filtration simultaneously by first coating the filter element with a filtration medium and/or powdered ion exchange resins. This application increases the performance in that some degree of depth filtration can be utilized in addition to surface filtration. Demineralization can also be accomplished simultaneously.

The materials applied before in this case are referred to "precoat" materials as they are applied before the system is put into actual service. If they are applied during the service cycle, they are referred to as "body feed" materials.

Surface filters, precoated filters and precoated and body fed filters have been used extensively in the water treatment and the chemical process industries. To date, there are many filter septa to tube sheet attachment mechanisms which are being employed. Since rather large filter vessels with as many as several hundreds of septa are used, there is frequently leakage through the attachment mechanism, thus allowing passage of upstream components of the process stream into the filtrate. The primary reason that the attachment mechanism fails is that it is often quite complex and requires remote handling tools. Commonly, if the filter septa has substantial strength, the septa is used as the remote tool device.

For long filter elements, on the order of 5 to 7 feet in length, complex spring attachment mechanisms, twist lock mechanisms, and simple threaded mechanisms are common. Again, during the repeated service and cleaning cycles these types of mechanisms are prone to be loosen and lead to subsequent service cycle leakage. Since usually a seal or gasket is required, any rotating action required during element insertion tends to deform the gasket material which also leads to eventual leakage while in service.

In many instances, any leakage of particulates or ions through the system can have very detrimental effects on the overall process operation and on materials in contact with the filtrate. For example, in boiler feed water treatment as found in, for example, steam generation water systems, ion exchange filtration is used to purify the water so that high alloy steels in the boiler do not fail. If ion exchange resins leak past the water treatment system, excessive alloy steel corrosion is effected rapidly, often requiring plant shut down and costly repairs.

DISCLOSURE OF INVENTION

In accordance with an embodiment of the invention a filter element adapter assembly is set forth. It serves for attaching a linearly extending filter element having a wall structure formed of a filtering material and having first and second end closures, the second end closure having a passageway therethrough and defining a filter element fitting to an attachment structure. The assembly comprises first and second tubular adapters and an insert seal formulated of a material which is softer than the adapters. Large screw threads are provided on the seal and on the portions of the adapters which screw onto the seal. The adapters abut a flange on the seal to provide a leak free arrangement.

In accordance with an embodiment of the present invention a filter element assembly is provided. It is adapted for attaching a linear extending filter element having a wall structure formed of a filtering material. The wall structure defines a longitudinal axis. First and second end closures are attached to the wall structure. The filter element and the end closures define an interior chamber extending from the first end closure to the second end closure. The second end closure has a passageway therethrough and defines a screw threaded fitting having screw threads centered about the longitudinal axis. The passageway communicates with the interior chamber. The filter element is to be attached to a screw threaded attachment structure having a passage therethrough adapted to be attached in flow communication with the interior chamber defined by the filter element. The adapter assembly comprises a linearly extending first tubular adapter having first and second end portions. The first end portion has a mating screw threaded fitting to the screw threaded fitting defined by the second end closure. The second end portion has screw threads that are less fine than those on the screw threaded fitting defined by the second end closure. A flange extends radially outwardly from the first adapter. The first adapter is formulated of material having a first hardness. A linearly extending insert seal is formulated of a material having a second hardness which is substantially less than the hardness of the first tubular adapter. The insert seal has first and second end portions. The first end portion defines a mating screw threaded fitting to the screw threads on the second end portion of the tubular adapter. The second end portion has screw threads that are less fine than those on the screw threaded fitting defined by the second end closure. The insert seal has a flange extending radially outwardly and defining a first ledge. The first ledge is adapted to face the first adapter. The second ledge is adapted to face in an opposite direction. the flange on the insert seal is of a construction and is located such that when the first tubular adapter and the insert seal are screwed together the first ledge seals with the flange on the first tubular adapter. A linearly extending second tubular adapter is formulated of a material having a third hardness which is substantially greater than the hardness of the insert seal. The second adapter has first and second end portions. The first end portion has a mating screw threaded fitting to the screw threaded fitting extending from the second end portion of the insert seal. The second end portion has screw threads which are finer than those on the screw threaded fitting extending from the second end portion of the insert seal. They are adapted to mate with the screw threads on the attachment structure. The flange on the insert seal is of a construction and is located such that when the second tubular adapter and the insert seal are screwed together the second ledge seals with the flange on the second tubular adapter.

Utilizing the filter element assembly of the invention one can readily change filter elements such as those in steam generation water systems when they become fouled or develop leaks. Basically all that has to be done is to match one set relatively coarse, for example Mason jar type, threads with another set of the same type threads. Because of the relative hardnesses of the materials of the parts of the adapter assembly, a leak proof seal can be readily attained. As a result, leakage is greatly reduced.

BRIEF DESCRIPTION OF THE DRAWINGS

The invention will be better understood by reference to the figures of the drawings where like numbers denote like parts throughout and wherein.

BEST MODE FOR CARRYING OUT INVENTION

Figure 1:
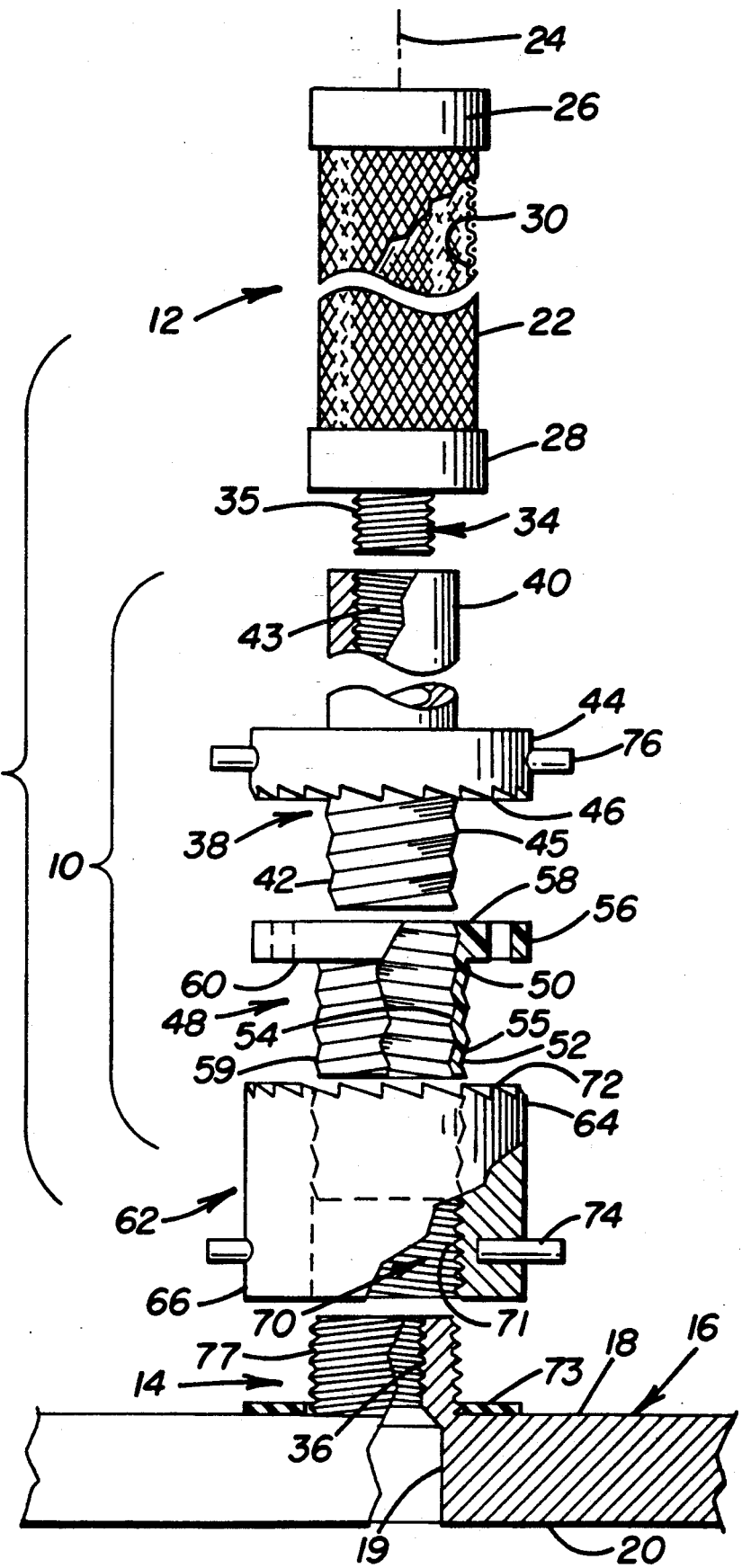
FIG. 1 illustrates in a side partially sectioned view, an embodiment of a filter element assembly in accordance with the present invention in separated form.
Figure 2:
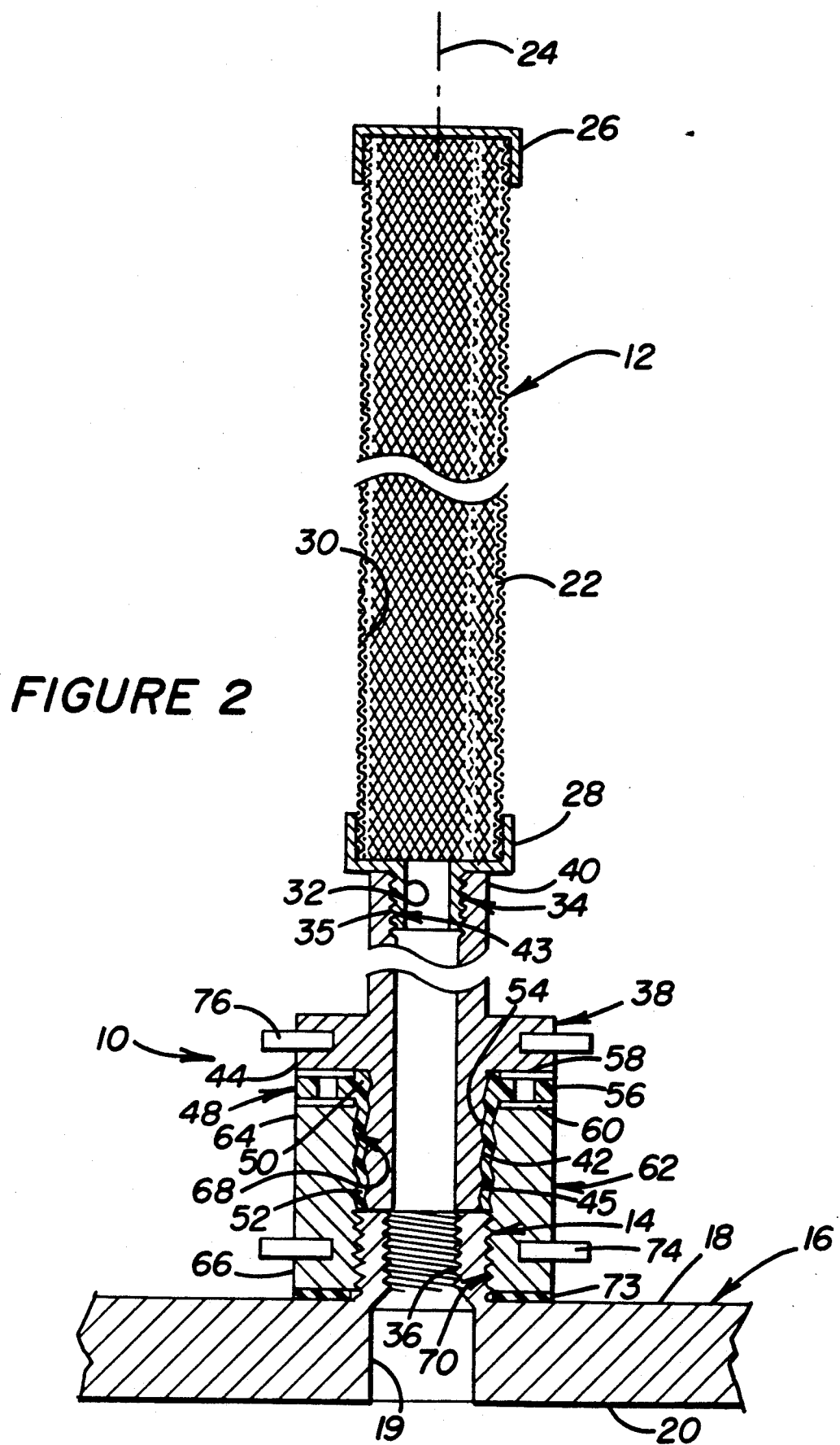
FIG. 2 illustrates the embodiment of FIG. 1 in assembled form.

FIGS. 1 and 2 illustrate a filter element assembly 10 in accordance with the present invention which is adapted for attaching a linearly extending filter element 12 to an attachment structure 14 which is itself attached as one of a plurality of such attachment structure 14 to a tube sheet 16 which is part of a boiler water cooling system. As will be noted the attachment structure 14 is attached to a first side 18 of the tube sheet 16 and provides a passage 19 to a second side 20 of the tube sheet 16.

The linearly extending filter element 12 has a wall structure 22 defining a longitudinal axis 24. The filter element 12 includes a first end closure 26 and a second end closure 28 which are attached to it. The filter element 12 and the end closures 26 and 28 defines an interior chamber 30 extending from the first end closure 26 to the second end closure 28. The second end closure 28 has a passageway 32 therethrough. The second end closure 28 defines a screw threaded fitting 34 in the embodiment illustrated a male fitting, having screw threads 35 centered about the longitudinal axis 24 of the filter element 12. The passageway 32 communicates with the interior chamber 30.

The attachment structure 14 has the passage 19 which passes through it. The passage 34 is adapted to be attached in flow communication with the interior chamber 30 defined by the filter element 12. Typically this is accomplished using some form of adapter. Alternatively, this can be accomplished in the absence of the adapter assembly 10 of the invention by screwing the screw threaded fitting 34 into threads 36 defined by the attachment structure 14. This is, however, difficult since the filter element 12 might typically be five or six feet in length, there are typically a plurality of such filter elements and the installer would generally have only the first end closure 26 and a portion of the wall structure 22 nearest the first end closure 26 to grasp when attempting to accomplish screwing in of the screw threaded fitting 34 to the threads 36 defined by the attachment structure 14.

In accordance with the invention, the adapter assembly 10 comprises three interacting parts. The first part is a linearly extending first tubular adapter 38 having a first adapter first end portion 40 and a first adapter second end portion 42. The first adapter first end portion 40 defines a mating screw threaded fitting 43 to the screw threaded fitting 34 defined by the second end closure 28. The first adapter second end portion 42 defines screw threads 45 which are less fine than the screw threads 35 on the screw threaded fitting 34 defined by the second end closure 28.

An adapter flange 44 extends radially outwardly from the first adapter 38. The first adapter 38 is formulated of a material having a first hardness. Generally, the first adapter 38 will be formed of a metallic material, most often a stainless steel. As will be noted, the screw threads on the first adapter second end portion 42 are on the exterior thereof and define a first male coupling. Note also that the adapter flange 44 includes rotational knurling 46 (shown in FIG. 1) facing towards the tube sheet 16 for a purpose which will shortly be apparent.

The second element of the adapter assembly 10 in accordance with the present invention is a linearly extending seal 48 which is formulated of a material having a second hardness which is substantially less than the hardness of the first tubular adapter 38. Generally the insert seal 48 will be formulated of a plastic material (such as polypropylene). Any number of polymeric materials, however, can be utilized. The insert seal 48 has a seal first end portion 50 and a seal second end portion 52. The seal 48 defines a mating screw threaded fitting 54 to the screw threads 45 on the first adapter second end portion 42. The seal 48 also defines screw threads 55 which are less fine than those on the screw threaded fitting 34 defined by the second end closure 28.

The insert seal 48 has a seal flange 56 extending radially outwardly and defining a first ledge 58 facing the first adapter 38 and a second ledge 60 facing in an opposite direction. The seal flange 56 is of a construction and is so located such that when the first tubular adapter 38 and the insert seal 48 are screwed together the first ledge 58 seals with the first adapter flange 44. In the embodiment illustrated the screw threads 59 on the seal second end portion 52 are on the exterior thereof and define a second male coupling. In the embodiment illustrated interior screw threads 55 in the seal 48 provide a female coupling for coupling with the screw threads 45 defined by the first adapter second end portion 42. The knurling 46 faces the first ledge 58 whereby locking of the adapter flange 44 to the first ledge 58 results when the first tubular adapter 38 and the insert seal 48 are screwed together.

The third element of the filter element adapter assembly 10 of the present invention is in the nature of a linearly extending second tubular adapter 62. The second tubular adapter 62 is formulated of material having a third hardness which is substantially greater than the hardness of the insert seal 48. Generally the second tubular adapter 62 will be formulated of a metal, often stainless steel and the first and third hardnesses may be identical although such is not required. The second adapter 62 has a second adapter first end portion 64 and second adapter second end portion 66. The second adapter first end portion 64 defines a mating screw threaded fitting 68 to the screw threads 45 defined by the seal second end portion 42. The second adapter second end portion 66 defines a fitting 70 having screw threads 71 finer than the screw threads 59 fitting defined by the seal second end portion 52 and being adapted to mate with screw threads 77 defined by the attachment structure 14.

The seal flange 56 is of a construction and is located such that when the second tubular adapter 62 and the insert seal 48 are screwed together the second ledge 60 seals with the second tubular adapter 62. In this manner the insert seal 48 provides for leak proof attachment of the entire filter element assembly 10. In the embodiment illustrated the screw threads 77 on the screw threaded attachment 14 are on the exterior thereof and define a third male coupling. Note that the second tubular adapter 48 can advantageously include rotational knurling 72 (shown in FIG. 1) which faces the second ledge 60 whereby locking of the second tubular adapter 62 to the second ledge 60 results when the second tubular adapter 62 and the insert seal 48 are screwed together.

In practice, the second tubular adapter 62 is fastened to the attachment structure 14 when the apparatus is empty of water or other fluids. A sealing washer 73 can be attached between the tube sheet 16 and the second end portion 66 of the second tubular adapter 62 at that time. Projecting lugs 74 are present for easy gripping by a spanner. Similar lugs 76 are present on the first adapter 38.

INDUSTRIAL APPLICABILITY

The present invention provides an adapter assembly 10 which is useful for attaching a filter element 12 to a tube sheet 16 in such environments as steam generation water systems. Ease of replacement of filter elements 12 is provided and leakage is significantly reduced.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A filter element adapter assembly, the adapter assembly attaching a linearly extending filter element having a wall structure formed of a filtering material, the wall structure defining a longitudinal axis, and first and second end closures attached to the wall structure, the filter element and the end closures defining an interior chamber extending from the first end closure to the second end closure, the second end closure having a passageway therethrough and defining a filter element fitting, the passageway communicating with the interior chamber; to an attachment structure defining an attachment structure fitting and having a passage therethrough which is adapted to be attached in flow communication with the interior chamber defined by the filter element, the adapter assembly comprising:

a linearly extending first tubular adapter having first adapter first and second end portions, the first adapter first end portion defining a first adapter first mating fitting to the filter element fitting, the first adapter second end portion defining coarse screw threads, and an adapter flange extending radially outwardly from the first adapter, the first adapter being formulated of a material having a first hardness;

a linearly extending insert seal formulated of a material having a second hardness which is substantially less than the hardness of the first tubular adapter, the insert seal having seal first and second end portions, the seal first end portion defining a seal mating fitting to the screw threads on the first adapter second end portion, the seal second end portion defining a seal second end portion fitting having coarse screw threads, the insert seal having a seal flange extending radially outwardly and defining a first ledge facing the first adapter and a second ledge facing in an opposite direction, the seal flange being of a construction and being located such that when the first tubular adapter and the insert seal are screwed together the first ledge seals with the first adapter flange; and a linearly extending second tubular adapter formulated of a material having a third hardness which is substantially greater than the hardness of the insert seal, the second adapter having second adapter first and second end portions, the second adapter first end portion defining a mating screw threaded fitting to the seal second end portion fitting, the second adapter second end portion defining a fitting adapted to mate with the attachment structure fitting, the seal flange being of a construction and being located such that when the second tubular adapter and the insert seal are screwed together the second ledge seals with the second tubular adapter.

2. A filter element assembly as set forth in claim 1, wherein the filter element fitting is a male screw fitting, the screw threads on the first adapter second end portion are on the exterior thereof defining a first male coupling, the screw threads on the seal second end portion are on the exterior thereof defining a second male coupling and the fitting on the attachment structure is screw threads on the exterior thereof defining a third male coupling.

3. A filter element assembly as set forth in claim 2, wherein the adapter flange includes rotational knurling facing the first ledge whereby locking of adapter flange to the first ledge results when the first tubular adapter and the insert seal are screwed together.

4. A filter element assembly as set forth in claim 3, wherein the second tubular adapter includes rotational knurling facing the second ledge whereby locking of the second tubular adapter to the second ledge results when the second tubular adapter and the insert seal are screwed together.

5. A filter element assembly as set forth in claim 2, wherein the second tubular adapter includes rotational knurling facing the second ledge whereby locking of the second tubular adapter to the second ledge results when the second tubular adapter and the insert seal are screwed together.

6. A filter element assembly as set forth in claim 1, wherein the adapter flange includes rotational knurling facing the first ledge whereby locking of adapter flange to the first ledge results when the first tubular adapter and the insert seal are screwed together.

7. A filter element assembly as set forth in claim 6, wherein the second tubular adapter includes rotational knurling facing the second ledge whereby locking of the second tubular adapter to the second ledge results when the second tubular adapter and the insert seal are screwed together.

8. A filter element assembly as set forth in claim 1, wherein the second tubular adapter includes rotational knurling facing the second ledge whereby locking of the second tubular adapter to the second ledge results when the second tubular adapter and the insert seal are screwed together.

9. A filter element assembly as set forth in claim 1, wherein the first and second adapters are formulated of metal and the insert seal is formulated of a polymeric material.

10. A filter element assembly as set forth in claim 9, wherein the filter element fitting is a male screw fitting, the screw threads on the second end portion of the first tubular adapter are on the exterior thereof defining a first male coupling, the screw threads on the second end portion of the insert seal are on the exterior thereof defining a second male coupling and the fitting on the attachment structure is screw threads on the exterior thereof defining a third male coupling.

11. A filter element assembly as set forth in claim 10, wherein the adapter flange includes rotational knurling facing the first ledge whereby locking of adapter flange to the first ledge results when the first tubular adapter and the insert seal are screwed together.

12. A filter element assembly as set forth in claim 11, wherein the second tubular adapter includes rotational knurling facing the second ledge whereby locking of the second tubular adapter to the second ledge results when the second tubular adapter and the insert seal are screwed together.

13. A filter element assembly as set forth in claim 10, wherein the second tubular adapter includes rotational knurling facing the second ledge whereby locking of the second tubular adapter to the second ledge results when the second tubular adapter and the insert seal are screwed together.

14. A filter element assembly as set forth in claim 9, wherein the adapter flange includes rotational knurling facing the first ledge whereby locking of adapter flange to the first ledge results when the first tubular adapter and the insert seal are screwed together.

15. A filter element assembly as set forth in claim 14, wherein the second tubular adapter includes rotational knurling facing the second ledge whereby locking of the second tubular adapter to the second ledge results when the second tubular adapter and the insert seal are screwed together.

16. A filter element assembly as set forth in claim 14, wherein the second tubular adapter includes rotational knurling facing the second ledge whereby locking of the second tubular adapter to the second ledge results when the second tubular adapter and the insert seal are screwed together.

17. A filter element assembly as set forth in claim 1, wherein the element fitting is a screw fitting and the attachment structure fitting is a screw fitting.

18. A filter element assembly as set forth in claim 17, wherein the adapter flange includes rotational knurling facing the first ledge whereby locking of adapter flange to the first ledge results when the first tubular adapter and the insert seal are screwed together.

19. A filter element assembly as set forth in claim 18, wherein the second tubular adapter includes rotational knurling facing the second ledge whereby locking of the second tubular adapter to the second ledge results when the second tubular adapter and the insert seal are screwed together.

20. A filter element assembly as set forth in claim 18, wherein the first and second adapters are formulated of metal and the insert seal is formulated of a polymeric material.

21. A filter element assembly as set forth in claim 17, wherein the first and second adapters are formulated of metal and the insert seal is formulated of a polymeric material.

22. A plurality of filter element assemblies as set forth in claim 1 in combination with a tube sheet which has first and second sides and which is part of a steam generation water system, a corresponding plurality of said attachment structures and a corresponding plurality of said adapter assemblies, wherein each of said attachment structures is attached to a first side of the tube sheet and wherein the passages in said attachment structures communicate through the tube sheet to the second side thereof.

23. A filter element adapter assembly the adapter assembly attaching
  a linearly extending filter element having a wall structure formed of a filtering material, the wall structure defining a longitudinal axis, first and second end closures attached to the wall structure, the filter element and the end closures defining an interior chamber extending from the first end closure to the second end closure, the second end closure having a passageway therethrough and defining a screw threaded filter element fitting having screw threads centered about the longitudinal axis, the passageway communicating with the interior chamber; to
  an attachment structure defining an attachment structure screw threaded fitting and having a passage therethrough adapted to be attached in flow communication with the interior chamber defined by the filter element,
the adapter assembly comprising:
  a linearly extending first tubular adapter having first adapter first and second end portions, the first adapter first end portion defining a mating screw threaded fitting to the filter element fitting, the second end portion defining screw threads which are less fine than those on the filter element screw threaded fitting, and an adapter flange extending radially outwardly from the first adapter, the first adapter being formulated of a material having a first hardness;
  a linearly extending insert seal formulated of a material having a second hardness which is substantially less than the hardness of the first tubular adapter, the insert seal having seal first and second end portions, the seal first end portion defining a mating screw threaded fitting to the screw threads on the first adapter second end portion, the seal second end portion defining screw threads which are less fine than those on the filter element fitting, the insert seal having a seal flange extending radially outwardly and defining a first ledge facing the first adapter and a second ledge facing in an opposite direction, the seal flange being of a construction and being located such that when the first tubular adapter and the insert seal are screwed together the first ledge seals with the first adapter flange;
  a linearly extending second tubular adapter formulated of a material having a third hardness which is substantially greater than the hardness of the insert seal, the second adapter having second adapter first and second end portions, the second adapter first end portion defining a mating screw threaded fitting to the screw threaded fitting defined by the seal second end portion, the second adapter second end portion defining screw threads finer than those on the screw threaded fitting defined by the seal second end portion and being adapted to mate with the attachment structure screw threaded fitting, the seal flange being of a construction and being located such that when the second tubular adapter and the insert seal are screwed together the second ledge seals with the second tubular adapter.

24. A filter element assembly as set forth in claim 23, wherein the filter element fitting is a male fitting, the screw threads on the second end portion of the first tubular adapter are on the exterior thereof defining a first male coupling, the screw threads on the second end portion of the insert seal are on the exterior thereof defining a second male coupling and the attachment structure fitting screw threads is on the exterior thereof defining a third male coupling.

25. A filter element assembly as set forth in claim 24, wherein the adapter flange includes rotational knurling facing the first ledge whereby locking of adapter flange to the first ledge results when the first tubular adapter and the insert seal are screwed together.

26. A filter element assembly as set forth in claim 25, wherein the second tubular adapter includes rotational knurling facing the second ledge whereby locking of the second tubular adapter to the second ledge results when the second tubular adapter and the insert seal are screwed together.

27. A filter element assembly as set forth in claim 24, wherein the second tubular adapter includes rotational knurling facing the second ledge whereby locking of the second tubular adapter to the second ledge results when the second tubular adapter and the insert seal are screwed together.

28. A filter element assembly as set forth in claim 23, wherein the adapter flange includes rotational knurling facing the first ledge whereby locking of adapter flange to the first ledge results when the first tubular adapter and the insert seal are screwed together.

29. A filter element assembly as set forth in claim 28, wherein the second tubular adapter includes rotational knurling facing the second ledge whereby locking of the second tubular adapter to the second ledge results when the second tubular adapter and the insert seal are screwed together.

30. A filter element assembly as set forth in claim 23, wherein the second tubular adapter includes rotational knurling facing the second ledge whereby locking of the second tubular adapter to the second ledge results when the second tubular adapter and the insert seal are screwed together.

31. A filter element assembly as set forth in claim 23, wherein the first and second adapters are formulated of metal and the insert seal is formulated of a polymeric material.

32. A filter element assembly as set forth in claim 31, wherein the filter element fitting is a male fitting, the screw threads on the second end portion of the first tubular adapter are on the exterior thereof defining a first male coupling, the screw threads on the second end portion of the insert seal are on the exterior thereof defining a second male coupling and the attachment structure screw threaded fitting is screw threads on the exterior thereof defining a third male coupling.

33. A filter element assembly as set forth in claim 32, wherein the adapter flange includes rotational knurling facing the first ledge whereby locking of adapter flange to the first ledge results when the first tubular adapter and the insert seal are screwed together.

34. A filter element assembly as set forth in claim 33, wherein the second tubular adapter includes rotational knurling facing the second ledge whereby locking of the second tubular adapter to the second ledge results when the second tubular adapter and the insert seal are screwed together.

35. A filter element assembly as set forth in claim 32, wherein the second tubular adapter includes rotational knurling facing the second ledge whereby locking of the second tubular adapter to the second ledge results when the second tubular adapter and the insert seal are screwed together.

36. A filter element assembly as set forth in claim 31, wherein adapter flange includes rotational knurling facing the first ledge whereby locking of adapter flange to the first ledge results when the first tubular adapter and the insert seal are screwed together.

37. A filter element assembly as set forth in claim 36, wherein the second tubular adapter includes rotational knurling facing the second ledge whereby locking of the second tubular adapter to the second ledge results when the second tubular adapter and the insert seal are screwed together.

38. A filter element assembly as set forth in claim 36, wherein the second tubular adapter includes rotational knurling facing the second ledge whereby locking of the second tubular adapter to the second ledge results when the second tubular adapter and the insert seal are screwed together.

39. A plurality of filter element assemblies as set forth in claim 23 in combination with a tube sheet which has first and second sides and which is part of a steam generation water system, a corresponding plurality of said attachment structures and a corresponding plurality of said attachment structures is attached to a first side of the tube sheet and wherein the passages in said attachment structures communicate through the tube sheet to the second side thereof.

* * * * *